No. 788,801. PATENTED MAY 2, 1905.
W. H. TROUT.
SAWMILL SET WORKS.
APPLICATION FILED MAY 17, 1900.
7 SHEETS—SHEET 1.
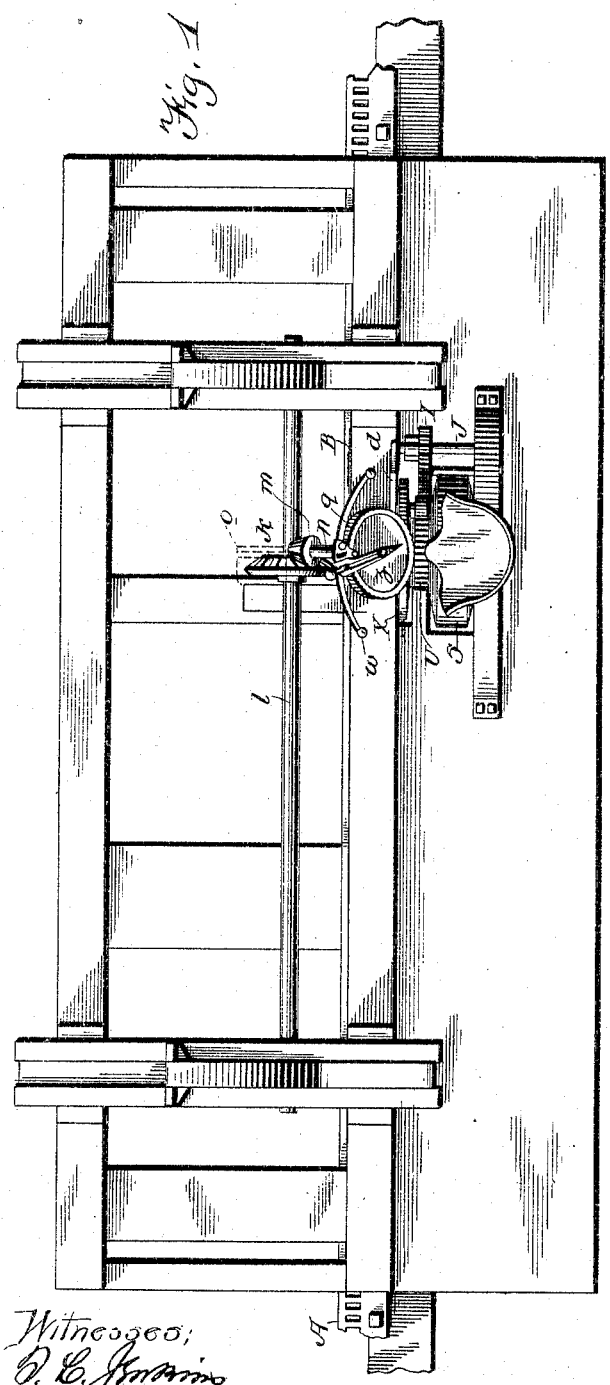
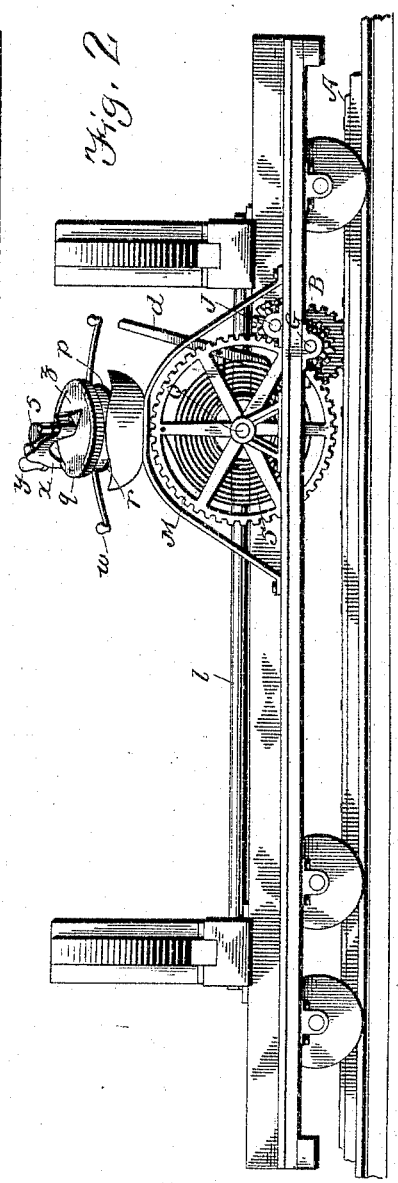
Witnesses:
Inventor:
William H. Trout,
by Dodge and Sons,
Attorneys

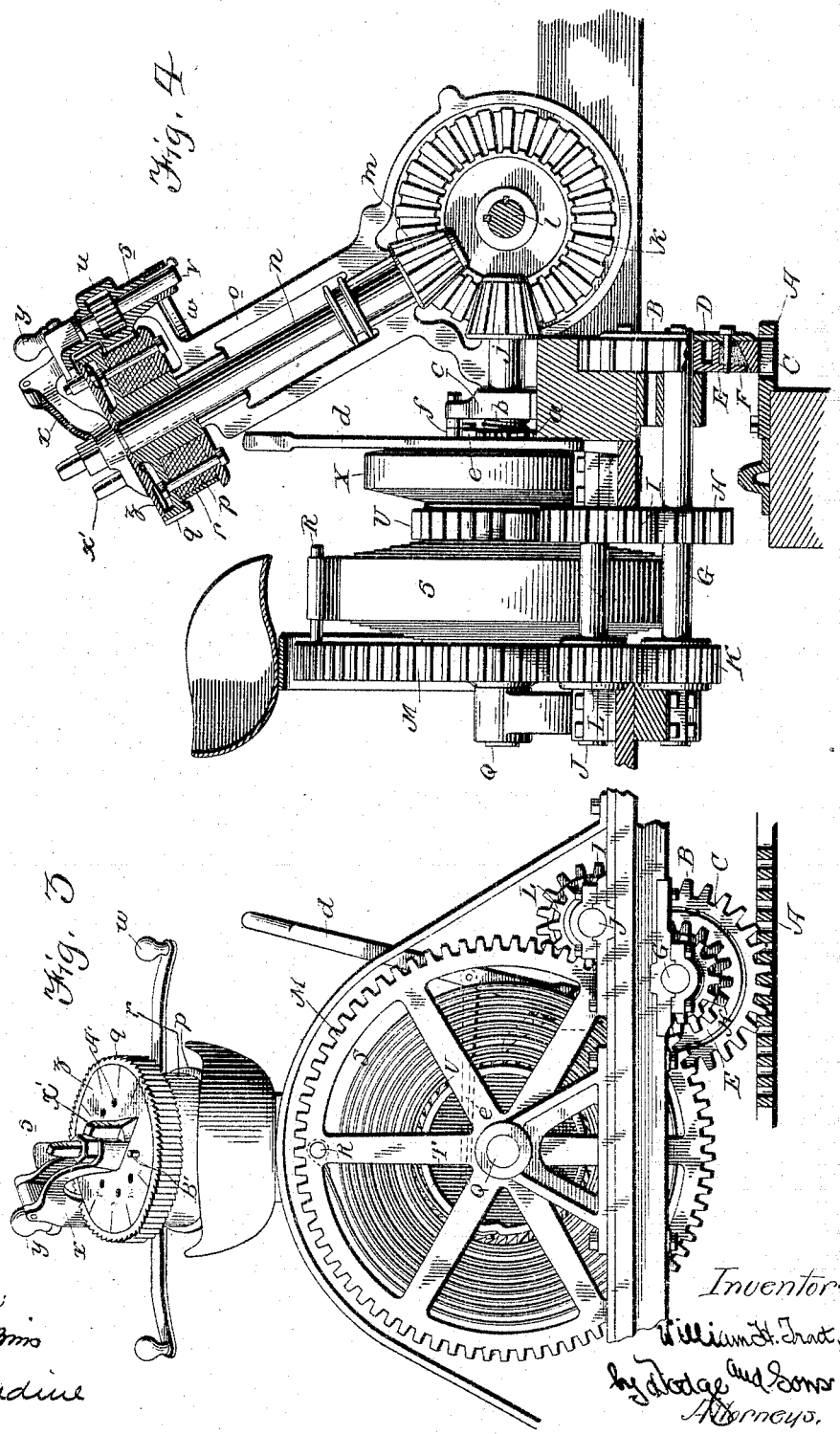

No. 788,801. PATENTED MAY 2, 1905.
W. H. TROUT.
SAWMILL SET WORKS.
APPLICATION FILED MAY 17, 1900.
7 SHEETS—SHEET 3.
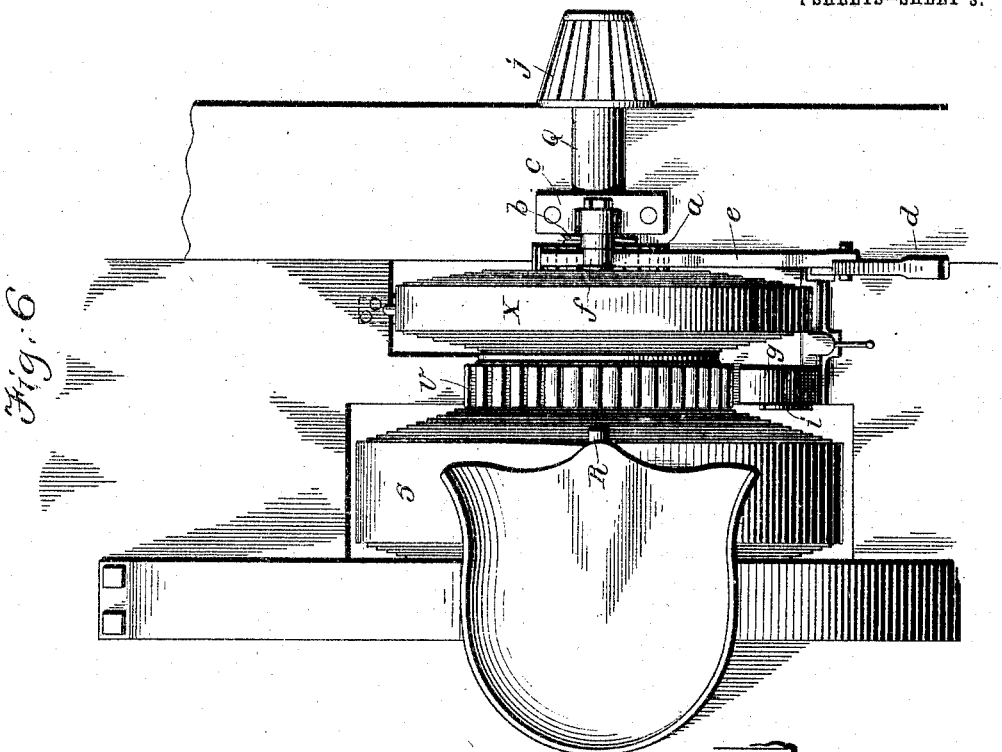
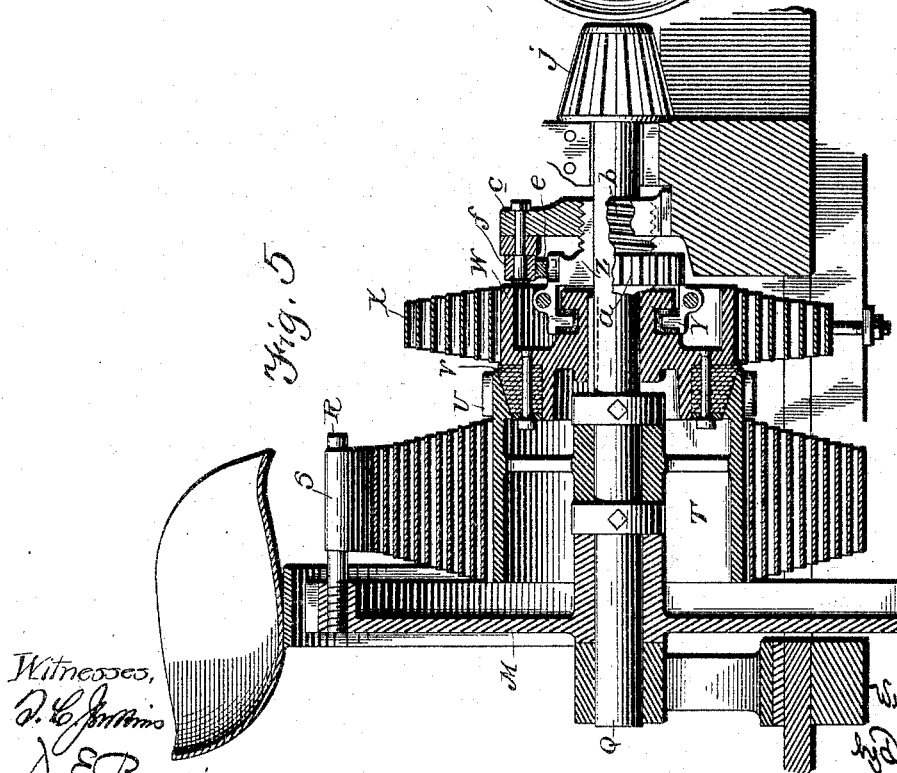
Witnesses          Inventor:

No. 788,801. PATENTED MAY 2, 1905.
W. H. TROUT.
SAWMILL SET WORKS.
APPLICATION FILED MAY 17, 1900.
7 SHEETS—SHEET 4.
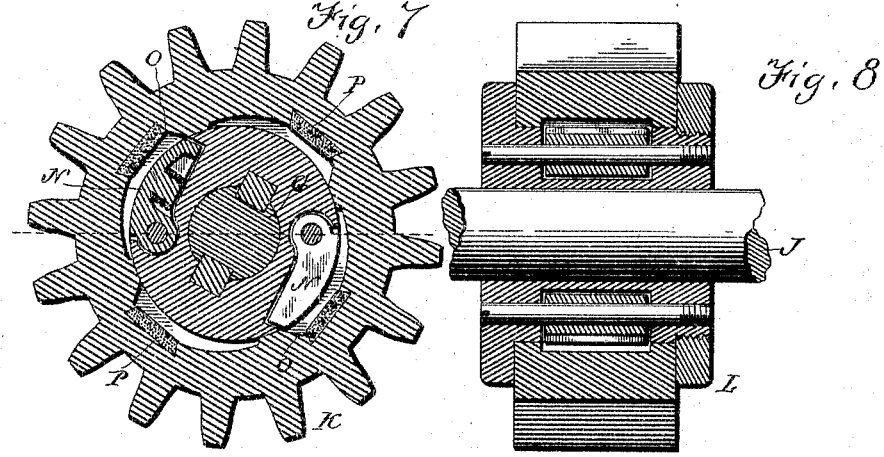
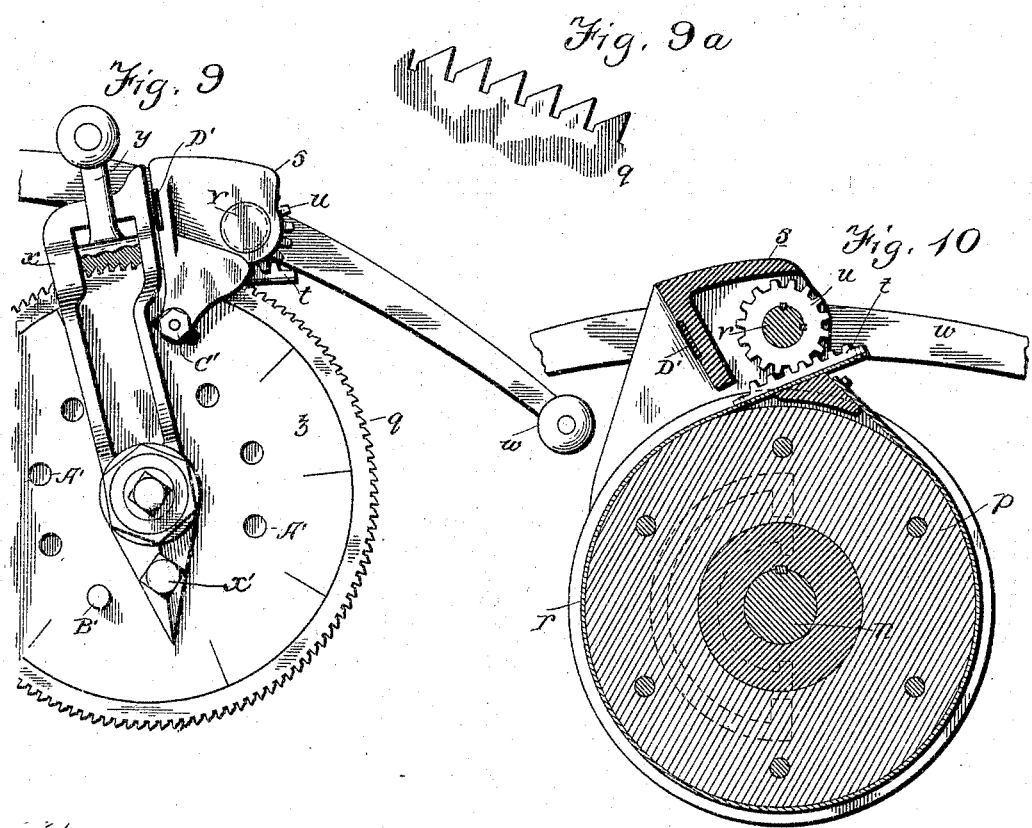
Witnesses,
Inventor:
William H. Trout,
by Dodge and Sons
Attorneys.

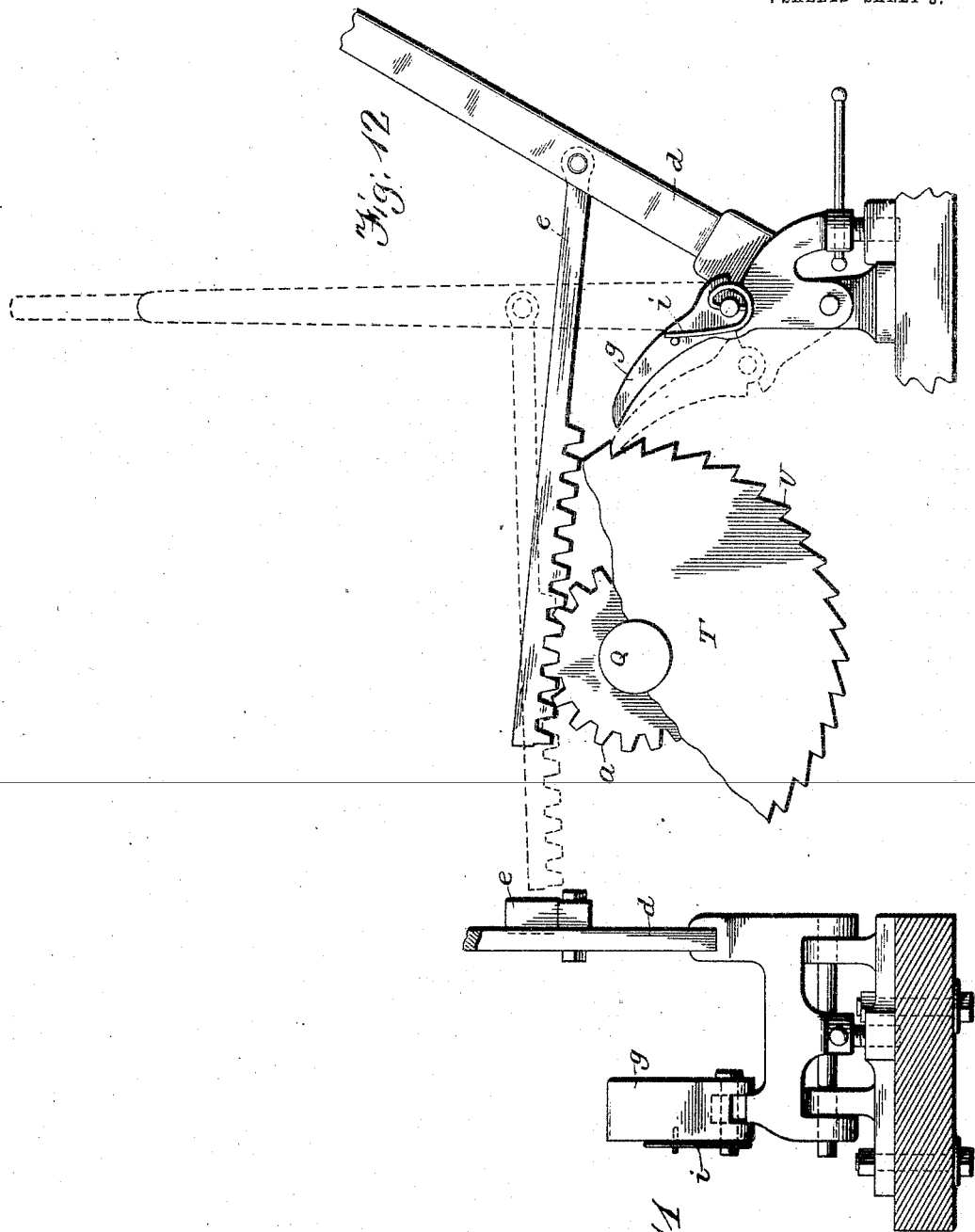

No. 788,801. PATENTED MAY 2, 1905.
W. H. TROUT.
SAWMILL SET WORKS.
APPLICATION FILED MAY 17, 1900.
7 SHEETS—SHEET 6.
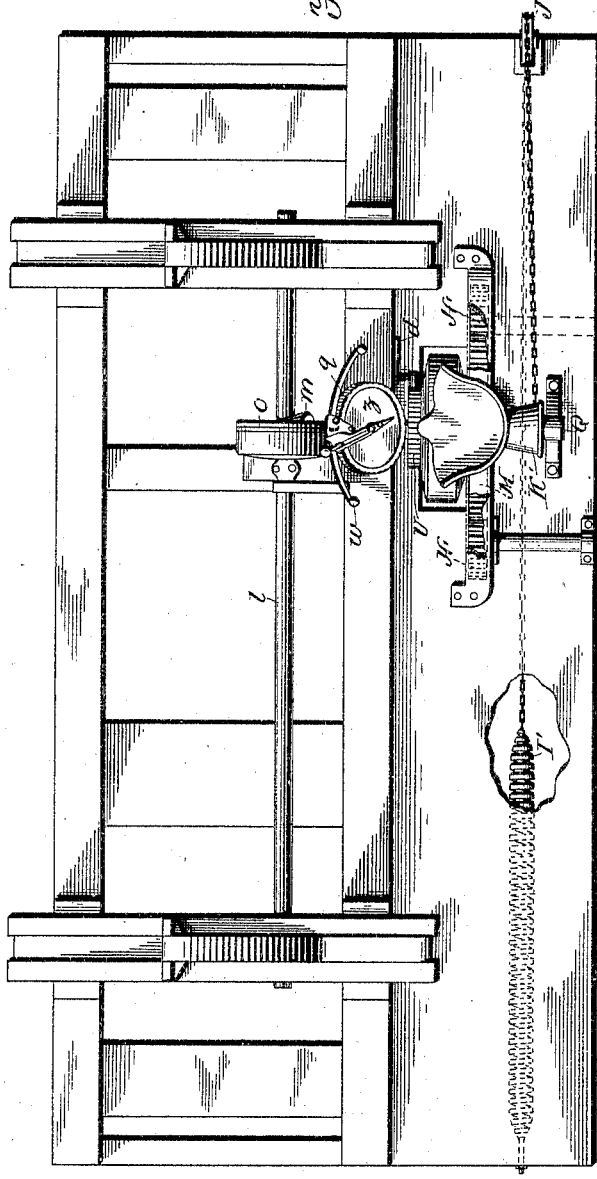
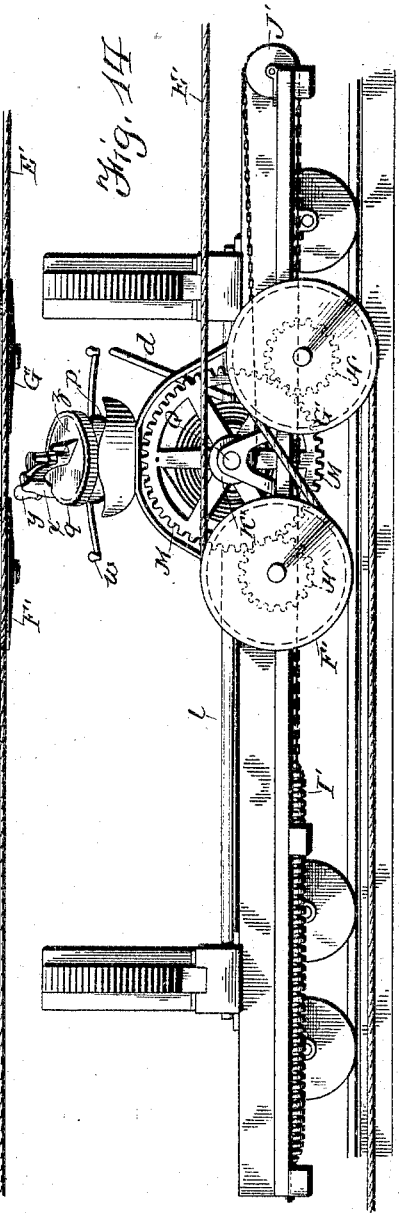
Witnesses:
Inventor:
William H. Trout,
by Dodge and Sons,
Attorneys.

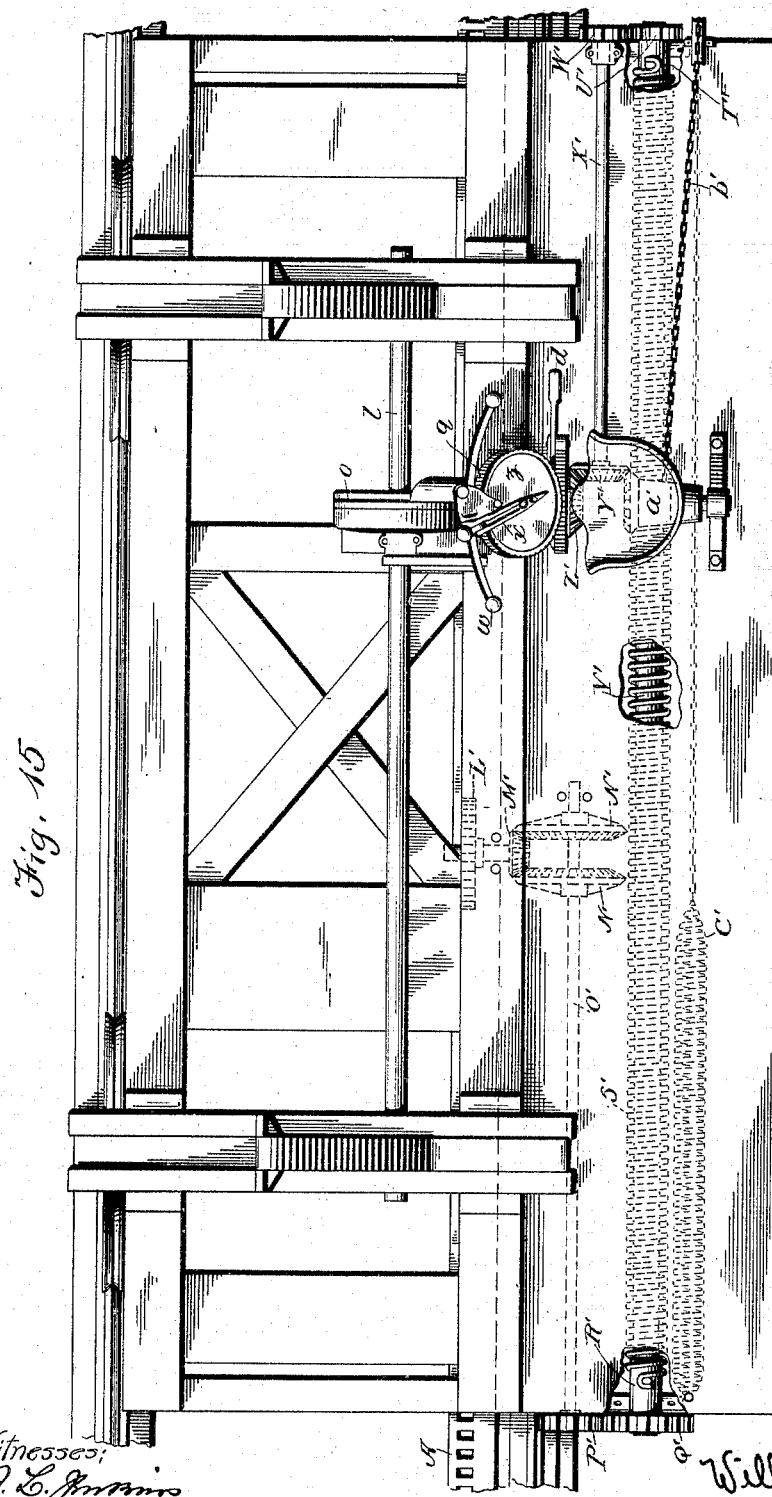

No. 788,801. Patented May 2, 1905.

UNITED STATES PATENT OFFICE.

WILLIAM HENRY TROUT, OF MILWAUKEE, WISCONSIN, ASSIGNOR, BY MESNE ASSIGNMENTS, OF ONE-HALF TO ALLIS-CHALMERS COMPANY, A CORPORATION OF NEW JERSEY.

SAWMILL SET-WORKS.

SPECIFICATION forming part of Letters Patent No. 788,801, dated May 2, 1905.

Application filed May 17, 1900. Serial No. 17,024.

*To all whom it may concern:*

Be it known that I, WILLIAM HENRY TROUT, a citizen of the United States, residing at Milwaukee, in the county of Milwaukee and State of Wisconsin, have invented certain new and useful Improvements in Sawmill Set-Works, of which the following is a specification.

My present invention relates to improvements in power set-works for sawmill-carriages, the construction and advantages of which will be hereinafter set forth, reference being had to the accompanying drawings, wherein—

Figure 1 is a top plan view of a sawmill-carriage, showing my invention applied thereto; Fig. 2, a side elevation of the same; Fig. 3, a side elevation of a portion of the apparatus, on an enlarged scale; Fig. 4, a similar view at right angles to Fig. 3; Fig. 5, a longitudinal sectional view; Fig. 6, a top plan view; Figs. 7 and 8, sectional views showing the clutch mechanism carried by some of the gears; Fig. 9, a top plan view of the brake and stop mechanism; Fig. 9$^a$, a detail showing the formation of certain portions of the mechanism; Fig. 10, a sectional view thereof; Fig. 11, a side elevation of one of the operating-levers; Fig. 12, another view of the same; Figs. 13 and 14, top and side elevations, respectively, showing a modified form of construction; and Fig. 15, a top plan view showing a further modified form of construction.

The object of my invention is to provide a construction wherein the power requisite for actuating the knees or set-works is ever ready to be applied or brought into use and its action restrained until occasion for its use occurs, when it is released to bring about the result desired.

The invention also has for its object the employment of means for assisting or retarding the power or otherwise controlling it until the parts come to a stop, designed for the purpose of preventing the possibility of overthrow.

In the drawings I have illustrated several constructions wherein power to actuate the set-works is stored up, the power being derived from the motion of the carriage during its feed and gig motions, which power may be given off or out when the carriage is standing or in motion. The storing of this power may be accomplished in a number of ways, as will be hereinafter pointed out in detail, a spring or springs being employed as the storage motor.

Referring more particularly to Figs. 1 to 12, inclusive, showing the principal embodiment of my invention, A indicates a rack secured to the framing of the mill, over which the carriage traverses, said racks being made open, so that no sawdust or the like may accumulate therein. With said rack there meshes a gear B, comprising an outer toothed ring C, a plate D, a compression-disk E, and an interposed paper friction F, which bears upon the inner face of the toothed ring. Said gear B thus built up is keyed to a shaft G and under usual circumstances causes the same to rotate; but should any unusual strain be placed thereon the ring will slip on the friction and rotate independently of the other portions of the apparatus. Shaft G carries a pinion H, which meshes with a similar pinion I, mounted upon a shaft J. The ends of said shafts carry pinions K and L, both of which mesh with a large gear M. Pinions K and L are provided with internal clutches, Figs. 7 and 8, comprising spring-pressed pawls or detents N, adapted and designed to engage shoulders or abutments O, formed in the outer portion of the pinions. Cushions P, preferably of leather, are so placed as to prevent the pawls from making a noise as they are thrown outwardly into engagement. The clutches in the pinions K and L are reversely arranged, so that one will run free while the other is working. From the connections thus far described it will be seen that both the forward and retrograde movements of the carriage serve to impart a continuous motion or rotation to the large gear M in one direction. Said gear M is mounted loosely upon a shaft Q, carried in suitable bearings on the carriage.

An arm or stud R extends outwardly from the gear and is connected to one end of a spring S, while the inner end of the spring is connected to a drum T, likewise loosely mounted on the shaft. Said drum is formed with a series of teeth U upon its outer face at one end and also with an internal frictional bearing-face, in conjunction with which there works a friction face or member V, carried by a sliding sleeve or drum W. Said drum is feathered upon the shaft so as to rotate therewith, but, as stated, may be moved longitudinally thereon. A spring X encircles the drum W, having one end connected thereto and the outer end to the framing of the carriage. (See Fig. 6.) The drum is provided with an internal hub formed with a groove, which is engaged by an inwardly-extending flange Y, formed as a part of a nut Z, rotatably mounted on the shaft. Said nut is provided with circumferential teeth $a$ and with a threaded projection $b$, which enters a threaded opening formed in a nut-stand $c$, secured to the framing of the carriage.

A lever $d$ is pivoted to one side of the mechanism just described and has pivotally connected thereto a rack $e$, which engages the teeth $a$, a roller $f$, carried by a stud, extending out from the nut-stand bearing on the upper face of the rack and holding it in contact with the teeth. The lever also carries a pawl $g$, pivotally connected thereto, as shown in Fig. 12, with a spring $i$ to throw the same forward and bring it into quick engagement with the ratchet-teeth U, formed on the main drum, while at the same time permitting the lever and the rack to have a further independent forward movement. This further movement throws the friction member V out of frictional coaction with the drum U.

To the inner end of the shaft Q there is secured a beveled pinion $j$, which in turn meshes with a bevel-gear $k$, secured upon the set-shaft $l$. A second pinion, $m$, keyed to a shaft $n$, also meshes with the gear $k$. Said shaft $n$ is carried by a suitable stand or column $o$, and to the upper end of said shaft is secured a friction pulley or wheel $p$, having combined therewith a toothed or spurred wheel $q$, the two rotating as one.

About the friction-wheel $p$ there is passed a flexible steel band or strap $r$, having one end thereof attached to a column $s$, extending upwardly and over the friction and spur wheel. The other end of the band has a rack $t$ secured thereto, which meshes with a pinion $u$, keyed to a shaft $v$, mounted in the column $s$. To the lower end of said shaft $v$ is attached a handle $w$, extending forwardly therefrom to each side, as is clearly indicated in Figs. 1, 2, and 3.

The upper end of the shaft $n$ carries an indicating and stop lever $x$, loosely mounted thereon, having pivoted to its outer end a locking lever or handle $y$, which is adapted to be brought into engagement with the teeth formed upon the spur-wheel $q$, the teeth by preference being formed in the manner shown in detail in Fig. 9$^a$. As will be noted upon reference to said figure, the base of the tooth is made rectangular, so as to resist the stopping and setting motion, as the form allows force to be applied in a forward as well as in a backward direction.

Mounted over the friction-disk $r$ there is a plate $z$, Figs. 4 and 9, provided with a series of openings A', into which may be inserted a stop-pin B', Fig. 9. Said plate is held in its position by the shaft $n$ and also by a bolt C', which passes down from the inwardly-projecting upper end of the column $s$ through a slot or opening formed in the plate. The slot of course permits adjustment of the plate as desired. The column $s$ acts as an abutment for the stop-lever, and to prevent jar of the parts a cushion D' is inserted in the face of the column, as best shown in Fig. 9. The upper end of the shaft $n$ is squared, so that should occasion require or it be found advantageous so to do a handle or crank may be applied thereto, whereby the operator may actuate the set-shaft direct—that is, manually—to recede the works. To set the works manually, the same handle is applied to the squared or polygonal stud or projection $x'$, Figs. 3 and 4, on the short end of the stop-lever $x$. This stud is also shown in Figs. 1, 2, 9, 13, and 14. In setting, therefore, the operator manipulates the locking-lever $y$ on the stop-lever $x$ with one hand and the detachable handle (not shown) applied to the stud $x'$ with the other hand. He has, therefore, in effect, a double lever locked to the shaft $n$ by the locking-lever $y$ on the stop-lever engaging with the wheel $q$, keyed to the shaft $n$. Such double lever is needful because of the greater work required in setting. In receding manually the same detachable handle (not shown) applied to the stud $x'$ during manual setting is applied to the squared portion of the upper end of the shaft $n$, and this single handle suffices to enable the operator to rotate the shaft $n$ to recede the works, there being little work required in this operation, as the works are running light without any load and the stop-lever being disengaged from the wheel $q$ through the locking-lever $y$. Such manual operation, however, is only necessary in case of the breaking of either or both of the actuating-springs S or X.

The operation of the mechanism thus far described is as follows: As the carriage moves back and forth a continuous rotary motion in one direction is imparted to the gear M through the gears H, I, K, and L and the gear B, which is actuated by the rack A. Thus it will be seen that the spring S is put under tension, the friction member V being held in close contact with the drum T, to which the spring S is connected. By reason of the friction V being carried by the drum W, which is splined to the shaft Q, said spring will tend to rotate the shaft and consequently move or actuate the set-shaft and the knees or set-works connected therewith. The movement of the set-shaft is, however, prevented by reason of the set-lever $x$ being in contact with the abutment, thus locking the gear $k$, and consequently the set-shaft $l$, against movement. As the carriage moves back and forth the gear B will of course be actuated by the rack, and it is possible under certain conditions that the spring S would, unless provision were made, be wound up too tight and strain be placed upon the parts. It is to prevent this condition that the gear B is made in the manner described—that is to say, is provided with means which permit its outer gear-ring to rotate independently of the remaining portion thereof, so that no motion will be imparted to the shaft G, and consequently no further tension placed upon the spring S. The paper friction V between the drums also serves as a means for relieving the parts from strain of momentum of drum T in suddenly arresting the setting motion. When it is desired to have the knees move forward, or, in other words, to set the log or timber, the operator puts on the brake $r$ and manipulates the handle $y$, bringing the set and stop lever $x$ around to the position where the shaft $n$ may when released move the distance required to bring about the desired forward movement of the knees. When the lever is adjusted, the operator by releasing the strap-brake through manipulation of the handles or levers $w$ permits the spring S, through its connections with the drum W, shaft Q, pinion $j$, and gear $k$, to actuate the set-shaft. As the stop-lever nears the cushion or abutment formed upon the column $s$ the operator may ease down the motion by gently applying the strap-brake. Of course when the stop-lever $x$ comes against the abutment further motion of the set-shaft is prevented; but should the tension of the spring S be such or the momentum of the parts be so great that there would be a tendency to further movement of the drum T said drum may slide upon the friction member V, thus preventing strain on the mechanism. As the spring S unwinds to actuate the set-works, and consequently rotates the shaft Q, the receding spring X will be wound up, and when it is desired to recede the knees the operator by manipulating the lever or handle $d$ withdraws the friction member V from its contact with the drum T and by the same manipulation throws the pawl $g$ into engagement with the teeth U upon the drum T, thereby preventing the spring S from unwinding and freeing the drum W from its connection with the drum T, whereby the spring X will rotate the shaft Q in such a direction as to rotate the shaft $l$ and recede the knees. Such spring action is, however, not manual control by means of the brake-strap $r$ coacting with the friction-wheel $p$ by actuating the handle $w$.

In Figs. 13 and 14 is shown a construction wherein a stationary rope E' is passed about two sheaves F' G', carried by suitable shafts mounted upon the carriage, said shafts being provided at their inner ends H' H' with reversing-pawl pinion, such as shown in Figs. 7 and 8, which mesh with the gear M and impart motion thereto, winding up or putting the spring S under tension, as in the case of the construction above referred to. The setting mechanism and the operative parts thereof are the same as have been already described. Instead of employing a spring X to recede the knees a large helical spring I' is mounted beneath the carriage, and a chain extending from one end thereof passes around a pulley J', mounted upon the opposite end of the carriage, and in turn is connected to a drum K', mounted upon the shaft Q. As motion is imparted to the shaft Q to set the knees through the agency of the spring S the chain will be wound up on the drum, placing the spring I' under tension. When the knees have been set forward to their full distance, the spring will be under such degree of tension that when the operator locks the spring S against further action and releases the shaft from its connection therewith said spring I' will rotate the shaft in the opposite direction, thereby receding the knees.

Fig. 15 shows a still further modification of the means employed for storing up the power by the movement of the carriage requisite to the actuation of the setting and receding mechanism. In this figure it will be noted that the rack is employed and a gear L' is in mesh therewith. Upon the end of the shaft opposite that to which said gear is attached is a bevel-pinion M', meshing with bevel-gears N' N', said gears being provided with reversing-pawls, such as have been heretofore described. The gears N' N' are mounted upon a shaft O', to the outer end of which is keyed a gear P', which in turn meshes with a gear Q', mounted upon a sleeve R'. To said sleeve is connected one end of a helical spring S', the opposite end of the spring being connected to a second sleeve T', carrying a gear U'. For the purpose of properly supporting the spring and also affording a suitable bearing for the sleeves a shaft or pipe V' extends through said sleeves and the spring. Gear U' meshes with a similar gear W', carried by shaft X', having secured to its opposite end a bevel-gear Y'. Said gear Y' meshes with a similar gear Z', which is connected to the shaft of the set-works corresponding to the shaft Q.

The gearing thus described is designed to place the spring S' under tension and to actuate the set-shaft, the controlling mechanism being the same as that shown and described in Figs. 1 to 12, inclusive. A drum $a'$ is in gear with the bevel-gear Y', and a chain $b'$ is connected to said drum and to a helical spring $c'$, which, as in Figs. 13 and 14, is employed to recede the knees, the spring $c'$ being put under tension during the setting movements.

Said receiver communicates with a cylinder $h'$ through a pipe $g'$, which is connected to the stationary hollow piston-rod of the cylinder. A rack $i'$ is formed or secured upon the upper face of the cylinder. The piston-rod and piston are fixtures, the cylinder moving thereon, the rack $i'$ meshing with a gear mounted upon a shaft corresponding to shaft Q. The cylinder during its longitudinal movement slides upon a steel plate or support $j'$, said plate being screwed or otherwise secured to the floor of the carriage.

Having thus described my invention, what I claim is—

1. The combination of a sawmill-carriage, a set-shaft on the carriage, a spring-motor on the carriage, yielding connections intermediate said motor and the set-shaft for rotating said shaft in a direction to effect setting, and means for disengaging said connections and restraining the motor against unwinding movement.

2. The combination of a sawmill-carriage, a set-shaft thereon, a spring-motor thereon, yielding connections intermediate said motor and the set-shaft, means for positively determining the degree of rotation of said set-shaft and consequently the extent of the set, means for disconnecting the set-shaft from said motor, means for holding the motor against further movement, and means for frictionally holding the set-shaft against retrograde movement.

3. The combination of a sawmill-carriage, set-works thereon, a reversible power-shaft for operating the set-works, manually-directed spring-power-storage means coacting with the power-shaft for interchangeably reversibly frictionally in but one direction operating the same, and means for limiting the storage of power.

4. The combination of a sawmill-carriage, set-works thereon, a spring-operated reversible power-shaft, positive gear connections between the power-shaft and the set-works, a spring-motor for operating the power-shaft for setting, means including a friction mechanism for storing power in the spring-motor from the motion of the carriage, a second spring-motor for operating the power-shaft for receding, and means for interchangeably reversibly operating through one spring-motor or the other.

5. The combination of a sawmill-carriage, a set-works thereon, a spring-operated reversible power-shaft, positive connections between the power-shaft and the set-works, a spring-motor for operating the power-shaft for setting, means including an adjustable friction mechanism for storing power in the spring-motor from the motion of the carriage, a drum on the power-shaft frictionally receiving power from the spring-motor, a second spring-motor coacting positively with the drum for operating the power-shaft for receding, and means for interchangeably reversibly operating through one spring-motor or the other.

6. In a sawmill set-works, a carriage, a set-shaft for operating knees on the carriage, a column on the carriage, a shaft supported by the column and geared to the said shaft, an arm swiveled on the column-shaft, means including a handle on the longer end of the arm for adjustably locking the arm to the column-shaft, and similar means on both the shorter end of the arm and on the column-shaft for interchangeable attachment of a handle.

7. In a sawmill set-works, a carriage, a set-shaft for operating knees on the carriage, power means for operating the set-shaft, means for disconnecting the power means from the set-shaft, a column on the carriage, a shaft supported by the column and geared to the set-shaft, an arm swiveled on the column-shaft, means including a handle on the longer end of the arm for adjustably locking the arm to the column-shaft, and similar means on both the shorter end of the arm and on the column-shaft for interchangeable attachment of a handle.

In testimony whereof I have signed my name to this specification in the presence of two subscribing witnesses.

WILLIAM HENRY TROUT.

Witnesses:
EDWARD KLAUSMAN,
B. A. BRENNAN.